Patented May 9, 1939

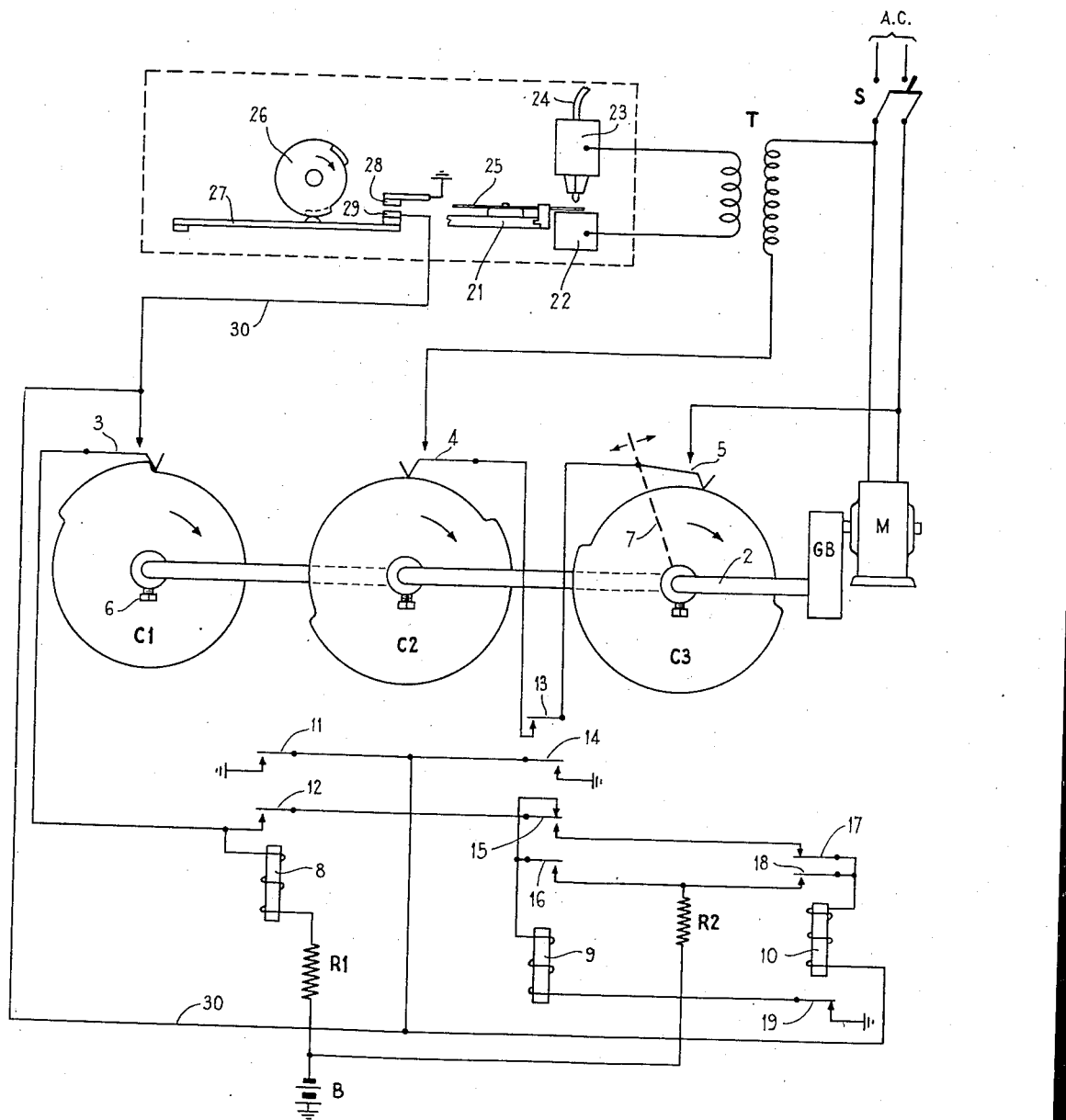

2,157,858

UNITED STATES PATENT OFFICE 2,157,858

SYNCHRONOUS CIRCUIT CONTROLLING APPARATUS

Merton R. Miller, Evanston, Ill., assignor to Associated Electric Laboratories, Inc., Chicago, Ill., a corporation of Delaware Application November 21, 1936, Serial No. 112,109

5 Claims. (Cl. 175—373)

The present invention relates in general to synchronous circuit controlling apparatus, and more in particular to an apparatus of this character which is adapted for use in controlling the welding circuit of a contact welding machine.

The invention will be described in detail hereinafter with reference to the accompanying drawing, which is a diagrammatic circuit drawing of the equipment and circuit connections involved in the invention, together with certain parts of a contact welding machine to which the invention is applied.

Referring to the drawing, the reference character S indicates a switch for extending connection from the control apparatus to an alternating current power line. A synchronous A. C. motor is indicated at M. Through the medium of a suitable set of reducing gears, indicated in the drawing as a gear box GB, the motor M drives a shaft 2, carrying the three cams C1, C2, and C3. Each cam has a hub in which is threaded a set screw such as 6, by means of which it may be secured in driven relation to the shaft 2.

The three cams C1, C2, and C3 have associated with them, respectively, the three spring contactors 3, 4, and 5. These spring contactors are mounted in line with their associated cams, and the contactors 3 and 4 may be permanently mounted in any suitable manner. The contactor 5, however, is preferably adjustable in an angular direction around the axis of the shaft 2, as indicated by the dotted line 7 and oppositely pointing arrows near the end thereof. Any suitable and well known arrangement may be used for this purpose. For example, the arrangement may comprise an adjustable brush holder such as is used on small generators.

Associated with the cams C1, etc., there are three relays 8, 9, and 10. These relays may be well known telephone type relays having spring contacts. A battery B may be provided to supply current for operating the relays.

The apparatus within the dotted rectangle at the upper left hand corner of the drawing is all part of a contact welding machine, which may be a machine such as is disclosed in the patent to Doyle, No. 1,794,670, granted March 3, 1931.

The above Doyle patent contains a complete disclosure of the contact welding machine, but for convenience the parts shown will be described briefly. The reference character 21 indicates a reciprocating carriage, only partly shown, which moves back and forth in a direction perpendicular to the plane of the drawing. Normally this carriage is positioned forward of the electrode 22. In the operation of the machine the operator places a blank spring 25, to which a contact is to be welded, onto the carriage 21, and starts the machine. The carriage 21 moves to the rear carrying the blank spring with it, until the spring 25 reaches a position above the electrode 22. The carriage 21 stops here a moment, while the chuck 23 is lowered automatically, pressing the end of the contact wire 24 against the spring 25 and forcing the end of the spring against the electrode 22. An instant later the cam 26 allows the spring arm 27 to close contacts 28 and 29 together, and as the Doyle machine is wired, these contacts close the primary circuit of a transformer such as T. The secondary of the transformer is connected across the electrode 22 and the chuck 23, and consequently welding current flows and the wire 24 is welded to the spring 25. After a brief interval the primary circuit is opened by cam 26 and the chuck 23 is raised. The wire 24 is now cut off near the spring 25, leaving a small piece attached to form the contact. The further operations of the machine are not of interest in connection with the invention and need not be explained.

When the present invention is applied to the Doyle machine, the operation is the same as described except for the control of the primary circuit of the transformer T. This circuit is not controlled directly by the cam 26 and contacts 28 and 29, but is controlled by the synchronous controlling apparatus, which is inserted between the contacts 28 and 29 of the welding machine and the transformer T. That is, and as shown in the drawing, the contacts 28 and 29 are used to initiate the operation of the control apparatus over the conductor 30 and the latter controls the primary circuit of the transformer by means of the spring contactors 4 and 5 and contact 13 of relay 9, as will presently be explained in detail.

The object of inserting the synchronous control apparatus is to overcome a certain defect in the Doyle machine. Although this machine is in extensive use it has been found that a small percentage of the welds produced are defective, that is, a certain number of contacts are improperly welded to the springs and are liable to break off in use. The trouble caused is sufficiently serious that some manufacturers deem it necessary or advisable to test every welded contact for strength of the weld so that contact springs with weakly welded contacts may be discovered and rejected. The variation in the strength of the welds is due to the variation in the amount of power used, and consequent variation in amount of heat developed in different welds and the fact that contacts 28 and 29 open and close in random relation to the phase characteristics of the power circuit is believed to be responsible. There are several ways in which a variation in the amount of power may be produced, which need not be discussed in detail. It may be mentioned, however, that a principal source of variation is the arcing which occurs when the circuit is broken with considerable current flowing. The arc may persist for a quarter cycle or more and as only about four cycles are used for a weld it will be seen that the intermittent arcing may vary the power by a considerable amount. The arcing also causes the contacts 28 and 29 to corrode, which may introduce a variable resistance factor, if cleaning of the contacts is neglected. The frequent cleaning of the contacts and their occasional replacement is something it would be desirable to avoid anyway, even if uniform welds were produced.

The defects above pointed out are eliminated by the synchronous controlling apparatus herein disclosed. By means of this apparatus the primary circuit of the transformer is closed at zero voltage, and is maintained closed for a definite number of cycles, or half cycles, and is broken at zero current. The make and break points are not maintained with absolute exactness, due to the slight hunting of the synchronous motor used to operate the apparatus, but there is no difficulty in maintaining them close enough so that arcing or sparking is substantially eliminated. The eliminaion of the arcing is found to cure the trouble formerly experienced, and at the same time it avoids the maintenance chages involved in cleaning and replacement of contacts.

The arrangement and operation of the invention may now be described more in detail. For this purpose it will be assumed that 60 cycle power is used and that the motor M runs at 1800 revolutions per minute, or 30 revolutions per second. The gear ratio is 5 to 1, and the cam shaft 2 therefore has a speed of 6 revolutions per second. Since the power frequency is 60 cycles per second, and the cam shaft speed is 6 revolutions per second it will be seen that one revolution of the cam shaft corresponds to 10 cycles. Considering the relation from the standpoint of the angular distance around one of the cams it will be evident that 36° on a cam corresponds to one cycle, 72° to two cycles, 108° to three cycles, etc.

As disclosed herein the cams are set for 4 cycle welding. The length of the raised or operative portion of cam C1 is 60°, and the cams C2 and C3 each have an operative portion equal to 190°. The drawing shows that cam C1 is just about to close contactor 3, and this point may be considered to be zero degrees for the purpose of explaining the setting of the cams. The following table shows the cam settings for 4 cycle welding, measured in degrees of rotation. The setting given for the break cam C3 is the theoretical setting based on the assumption that the current is in phase with the voltage, and usually has to be modified in practice as will be explained.

```
  0° control cam C1 closes
 60° control cam C1 opens
 69° break cam C3 closes
115° make cam C2 closes
259° break cam C3 opens
305° make cam C2 opens
```

The following settings are suitable for 3 cycle welding:

```
  0° control cam C1 closes
 33° break cam C3 closes
 60° control cam C1 opens
115° make cam C2 closes
223° break cam C3 opens
305° make cam C2 opens
```

It will be appreciated, in considering the above tables, that the duration of circuit closure of the welding circuit is measured from the time at which the make cam C2 closes until the time the break cam C3 opens. In the first table this interval is equal to 144°, corresponding to 4 cycles. In the second table the closed interval is equal to 108°, corresponding to 3 cycles. By properly setting cam C3 relative to cam C2 the apparatus may be set for any desired welding interval such as ½ cycle, 1 cycle, 1½ cycles, and so on up to 5 cycles. The limit with the apparatus as shown is about 5 cycles, for about half the angular distance of each cam shaft rotation is required for controlling the relays.

In setting the cams it is the best practice to set the make cam C2 first. In order to do this one side of the power supply line is connected to one deflector plate of a cathode ray oscillograph and the other side is connected through contacts 5, 13, and 4 in series to the other deflector plate. The oscillograph of course has two other deflector plates to which a low frequency alternating current source is connected and which deflects the ray back and forth on a line which serves as a time axis. With the motor M running at synchronous speed lead 30 is grounded momentarily, whereupon the apparatus will operate to close the circuit from the power supply leads to the oscillograph for a definite interval of several cycles, as will be more fully explained in describing the operation as it takes place in welding. By viewing the wave in the oscillograph, repeating the operation several times if necessary, the point at which the wave starts can readily be determined and the necessary adjustment of cam C2 can be made.

The control cam C1 and the break cam C3 are of course changed also after setting the make cam C2, the control cam C1 being set to close 115° in advance of cam C2 and the break cam C3 being set to close 69° later than cam C1, assuming that 4 cycle welding is to be used. It may be necessary to make several adjustments, viewing the result each time in the oscillograph, before the desired setting of cam C2 is secured.

After the cams have been properly set the temporary hook up to the oscillograph can be abondoned and the circuits are restored to their permanent condition as shown in the drawing. Before starting to weld however it is desirable to adjust the contactor 5 to take care of any phase difference there may be between the voltage and current. A suitable procedure is to connect a variable resistance across the chuck 23 and electrode 22, or across the secondary terminals of transformer T. With the motor M running at synchronous speed and with considerable resistance in the secondary circuit, the relay 9 may now be operated by hand to close the primary circuit. While the circuit is closed the contactor 5 is observed closely to see if any sparking takes place and if it does the contactor is adjusted until the sparking ceases. The resistance in the secondary circuit may now be cut out in several stages and slight readjustments may be made if necessary. The drawing shows the contactor 5 is adjusted for a current lag of about 12°.

Before starting to weld it may also be necessary to adjust the cam 26 on the welding machine, which is probably set for 4 or 5 cycle welding. This is not a long enough interval to insure that the control cam C1 will always close while contacts 28 and 29 are closed, and accordingly cam 26 is adjusted, as described in the Doyle patent, to increase the closed interval. An interval of 9 cycles is long enough, as will presently be made clear.

Assuming now that the equipment is all in order and connected as shown in the drawing, and that the switch S is closed, the operator may place a blank spring 25 on the carriage 21 and start the machine. The carriage 21 moves to the rear and stops with the end of spring 25 positioned underneath the chuck 23 and above the electrode 22. The chuck 23 now descends and presses the end of wire 24 against spring 25, forcing the latter against the electrode 22. The cam 26 is timed with respect to the movement of carriage 21 and chuck 23 and now permits contacts 28 and 29 to close. When these contacts close the contactor 3 may be closed or opened. If it has just opened it will close again before contacts 28 and 29 open, as the closed period of contacts 28 and 29 is 9 cycles or a little more while the open period of contactor 3 is 300°, or somewhat less than 9 cycles.

It will be clear therefore that cams 26 and C1 will jointly close a circuit for relay 8, the circuit extending from ground by way of contacts 28 and 29, lead 30, contactor 3, winding of relay 8, and resistance R1 to battery B. On energizing, relay 8 prepares a circuit for relay 9 at contact 12, and at contact 11 places ground on lead 30. The latter operation closes a locking circuit for relay 8 independent of contacts 28 and 29, which may open just after relay 8 energizes.

When cam C1, or rather contactor 3, breaks, relay 9 energizes over a circuit extending from ground at 19 by way of the winding of relay 9, back contact 15, contact 12, winding of relay 8, and resistance R1 to battery. On energizing, relay 9 closes its contact 16 first and thereby locks itself through resistance R2 to battery B. At 14, relay 9 places another ground on lead 30, and at 15 contact 12 of relay 8 is transferred from connection with the winding of relay 9 to connection with the winding of relay 10. As regards relay 8, when contactor 3 breaks, the introduction of relay 9 into the circuit of relay 8 considerably reduces the current flow through the relay, and the current flow is further reduced when contact 16 of relay 9 closes, as the closure of these contacts shunts relay 8 by way of resistance R2. Accordingly, relay 8 falls back almost instantly upon the opening of its circuit at back contact 15 and opens contact 12 before it can lock in series with relay 10 by way of front contact 15.

It will be noted that relay 9 closes a point in the circuit of the primary winding of transformer T at contact 13. Although the primary circuit may carry as high as 30 or 40 amperes, ordinary relay contacts may be used at 13, for the circuit is never broken at this point while current is flowing.

Shortly after the control cam C1 breaks, the break cam C3 closes, that is, operates contactor 5. This closes another point in the circuit of the primary winding of transformer T.

A little later the make cam C2 operates contactor 4, which completes the primary circuit. The circuit is closed at zero voltage and accordingly no sparking takes place. The circuit remains closed for an interval corresponding to 4 cycles and during this interval current flows in the secondary circuit of the transformer T and the wire 24 is welded to spring 25.

The 4 cycle welding interval is terminated by the opening of contactor 5 by break cam C3, which takes place 144° after the closure of contactor 4, plus the allowance for current lag as provided by the adjustment of contactor 5. As the circuit is broken at zero current no sparking occurs.

Finally, the make cam C2 opens contactor 4. This completes the operations incident to one revolution of the cam shaft. However, relay 9 is still locked up and it will be necessary to consider the next revolution to complete the explanation.

When the cam C1 begins the next revolution, it closes contactor 3 as before. At this time the contacts 28 and 29 may or may not be open. Whether open or not, there is a ground on lead 30 due to relay 9 being locked up at this time. Accordingly when contactor 3 closes a circuit is again completed for relay 8, which energizes and prepares a circuit for relay 10 at contact 12. When contactor 3 opens relay 10 energizes in series with relay 8, the circuit extending from grounded lead 30 by way of the winding of relay 10, back contact 17, front contact 15, contact 12, winding of relay 8, and resistance R1 to battery B. On energizing, relay 10 locks itself at contact 18, and opens the circuit of relay 8 at contact 17. Relay 8 accordingly falls back. Relay 10 also opens the circuit of relay 9 at 19, and relay 9 falls back. On deenergizing, relay 9 opens the primary circuit at 13. This takes place before contactor 4 closes and prevents another closure of the primary circuit on this revolution of cams C2 and C3. Relay 9 also takes ground off lead 30 at 14 and as contacts 28 and 29 have opened by this time relay 10 falls back.

The cam 26 closes contacts 28 and 29 only once on each operation of the welding machine. After the contacts open a short interval elapses in which the chuck 23 remains in welding position, this interval being long enough to permit the control apparatus to function in the event that it happens to be started just before contacts 28 and 29 open. The chuck is then raised and the wire 24 is severed just above the spring 25. The carriage 21 then moves further to the rear, where the contact is formed, and finally moves forward to its initial position where the completed spring 25 can be removed.

While a certain specific arrangement of the parts has been described for the sake of clearness, it will be understood that the invention is not restricted to this specific arrangement and may be modified to meet different conditions. It will be undersood also that the invention is not necessarily limited to use in connection with a contact welding machine, but will be found to be of value in many situations where alternating current circuits carrying heavy currents have to be broken. I do not therefore wish to be limited to the precise embodiment shown and described, but desire to include and have protected by Letters Patent, all forms of my invention that come within the scope of the appended claims.

What is claimed is:

1. In combination, an alternating current power line, a branch circuit supplied from said line at intervals, a switch adapted to be closed when the branch circuit is to be used, a synchronous motor driven from said line, cams driven by said motor, contactors controlled by said cams, included in said branch circuit in series, one cam being adjusted to close at zero voltage and the other being adapted to break at zero current, relay mechanism, and means including said switch and another cam driven by said motor for causing said relay mechanism to place the said branch circuit under control of said first mentioned cams during one revolution thereof.

2. Apparatus comprising a continuously operating synchronous motor, a source of alternating current, a branch circuit to be controlled, a cam shaft with three cams driven by said motor, a contactor for the first of said cams, a source of direct current, control relays adapted to be energized from said source of direct current, an energizing circuit for a first of said relays completed responsive to the closure of the contactor associated with said first cam, means responsive to the energization of said first relay for preparing an energizing circuit for a second of said relays, said second relay energized in said prepared circuit when the initial energizing circuit for the first of said relays is opened by the action of said first cam, means responsive to the energization of the second of said relays for maintaining said second relay energized independent of said first relay and for closing a point in said branch circuit, and contactors controlled by the second and third of said cams for connecting said branch circuit to said source of alternating current, said second cam adapted to close its associated contactor to complete said circuit when the voltage of said source of alternating current is zero, and said third cam adapted to break said circuit after a predetermined number of cycles when the voltage of said alternating current source is zero.

3. In a control apparatus, a circuit to be controlled, a source of alternating current, a motor operated from said source, a cam shaft having a plurality of cams driven by said motor, a first control relay, a source of direct current, a contactor controlled by a first of said cams closed momentarily each time said shaft starts a revolution for connecting said source of direct current to said relay to cause it to momentarily energize, a second and a third control relay, means responsive to the first momentary energization of said first relay for preparing a circuit for itself in series with said second relay which circuit is completed to cause the energization of said second relay when the momentary energizing circuit for said first relay is broken, means responsive to the energization of said second relay for completing a locking circuit for itself, for disconnecting said first relay to cause its deenergization, and for preparing a circuit for said third relay, means responsive to the second momentary energization of said first relay responsive to the second revolution of said shaft for preparing a circuit for itself in series with said third relay which circuit is completed to cause the energization of said third relay when the momentary energizing circuit for said first relay is broken, means responsive to the energization of said third relay for restoring all of said relays to normal, and means including other cams on said cam shaft and a contact controlled by said second relay in series for completing said circuit to be controlled every other revolution of said cam shaft.

4. In combination, a circuit to be controlled, a source of alternating current, a motor driven from said source, a cam shaft having three cams driven by said motor, a contactor for each of said cams, a source of direct current, a plurality of relays controlled from said direct current source, a first of said cams adapted to close its contactor on each revolution of said cam shaft to cause a momentary energization of a first of said relays, a second of said relays adapted to be energized each time said first relay is energized on the odd numbered revolution of said cam shaft, a third of said relays adapted to be energized on the even numbered revolutions of said cam shaft to cause the deenergization of said second and third relays to restore the relays to normal, and said circuit to be controlled including the contactors of the second and third of said cams in series with a contact controlled by said second relay adapted to be connected on each odd numbered revolution of said cam shaft to said source of alternating current when the voltage therein is zero and adapted to be disconnected therefrom when the voltage is zero after a predetermined number of cycles.

5. In combination, a controlling circuit, a synchronous motor, a cam shaft having three cams driven by said motor, three relays, means controlled by a first of said cams for momentarily energizing a first of said relays upon each rotation of said cam shaft, means controlled on successive energizations of the first of said relays for alternately completing an energizing circuit for each of the other of said relays, means controlled by the second of said relays for preparing said controlling circuit, means controlled by said other two cams for completing and disconnecting said controlling circuit once on each odd numbered revolution of said cam shaft, and means controlled by the third of said relays for restoring said second relay to normal and then restoring itself to normal.

MERTON R. MILLER.